United States Patent [19]
Matsumoto et al.

[11] Patent Number: 5,638,933
[45] Date of Patent: Jun. 17, 1997

[54] CLUTCH DEVICE

[75] Inventors: Shogo Matsumoto; Kiyohito Murata, both of Susono, Japan

[73] Assignee: Toyota Jidosha Kabushiki Kaisha, Toyota, Japan

[21] Appl. No.: 618,894

[22] Filed: Mar. 20, 1996

[30] Foreign Application Priority Data

Mar. 24, 1995 [JP] Japan .................................. 7-066252

[51] Int. Cl.⁶ ........................... F16D 25/063; F16D 25/02
[52] U.S. Cl. ................... 192/52.5; 192/54.5; 192/54.52; 192/85 AA; 475/126
[58] Field of Search .......................... 192/52.5, 54.5, 192/54.52, 70.23, 85 AA, 93 A; 475/125, 126, 146

[56] References Cited

U.S. PATENT DOCUMENTS

| | | |
|---|---|---|
| 2,827,994 | 3/1958 | Tiedeman et al. . |
| 3,199,374 | 8/1965 | O'Malley et al. . |
| 3,239,042 | 3/1966 | Jandasek .................. 192/52.5 |
| 3,674,118 | 7/1972 | Klaue . |
| 3,688,882 | 9/1972 | O'Malley . |
| 3,717,229 | 2/1973 | Perlick . |
| 3,733,920 | 5/1973 | Annis . |
| 5,031,746 | 7/1991 | Koivunen . |
| 5,036,963 | 8/1991 | Murata . |
| 5,070,975 | 12/1991 | Tanaka et al. . |
| 5,106,348 | 4/1992 | Koivunen . |
| 5,464,084 | 11/1995 | Aoki et al. . |
| 5,485,904 | 1/1996 | Organek et al. .................. 192/54.52 X |

FOREIGN PATENT DOCUMENTS

| | | |
|---|---|---|
| 953857 | 12/1956 | Germany . |
| 4010678 | 10/1991 | Germany . |
| 266328 | 3/1990 | Japan . |
| 269134 | 5/1990 | Japan . |
| 1149573 | 4/1969 | United Kingdom . |
| 2251465 | 7/1992 | United Kingdom . |

OTHER PUBLICATIONS

"The Multi–Mode Clutch—A New Technology for Freewheeler Shifting Automatic Transmissions", Erkki A. Koivunen, et al., pp. 181–194, Date Unknown.

Primary Examiner—Richard M. Lorence
Attorney, Agent, or Firm—Oblon, Spivak, McClelland, Maier & Neustadt, P.C.

[57] ABSTRACT

This clutch device has a first cam mechanism and a second cam mechanism disposed on a relatively rotatable a pair of members. When the first cam mechanism is pushed by a piston to one of the pair of members rotating in a direction, the first cam mechanism generates a thrust force corresponding to an input torque and thereby the relatively rotating members are engaged. When the second cam mechanism is pushed by a piston to one of the pair of members rotating in a reverse direction, the second cam mechanism generates a thrust force corresponding to the pushing force of the piston, and thereby the relatively rotating members are engaged. A return spring giving a biasing force to separate the second cam member from the one of relatively rotating member is designed not to reduce the thrust force generated by the first cam member during the action of the first cam mechanism.

13 Claims, 19 Drawing Sheets

Fig.2

| RANGE | GEAR | $C_1$ | $C_2$ | $C_3$ | $B_1$ | $B_2$ | $B_3$ | $B_4$ | $F_1$ | $F_2$ | $F_3$ |
|---|---|---|---|---|---|---|---|---|---|---|---|
| P | (PARKING) | | | ON | | | | | | | |
| R | (REVERSE) | | ON | ON | | | ON | | | | |
| N | (NEUTRAL) | | | ON | | | | | | | |
| D | O/D | ON | ON | | | ON | | ON | | | |
| D | THIRD | ON | ON | ON | | ON | | | | | ON |
| D | SECOND | ON | | ON | | ON | | | ON | | ON |
| D | FIRST | ON | | ON | | | | | | ON | ON |
| 2 | SECOND | ON | | ON | ON | ON | | | ON | | ON |
| 2 | FIRST | ON | | ON | | | | | | ON | ON |
| L | FIRST | ON | | ON | | | ON | | | ON | ON |

CLUTCH DEVICE

BACKGROUND OF THE INVENTION

1. Field of the Invention

The present invention relates to a clutch device used in an automatic transmission for an automobile.

2. Description of the Related Art

Clutch devices are disclosed in Japanese Patent Application Nos. 6-48806 and 6-69632 (corresponding to Unexamined Patent Publication (Kokai) Nos. 7-259885 and 7-279992) filed in the name of the assignee of the present application, wherein a cam mechanism is provided between two members rotating relatively to each other so that a force generated due to the relative rotation of the members and acting in the circumferential direction is converted to a thrust acting in the axial direction which is used as a clutch-engagement force.

According to the above clutch devices, it is possible to miniaturize the clutch device as a whole by the reduction of the number of clutch disks and by the elimination of a one-way clutch due to the utilization of a booster function and a unidirectional action of the cam mechanism.

It was noticed that a self-tightening engagement which increases the engagement force corresponding to increase of rotational torque can be obtained when a cam angle $\theta$ is chosen to satisfy $\mu > \tan \theta$, and a boosting engagement which increases the engagement force corresponding to increase of pushing force which pushes the cam mechanism to one of the relatively rotating members can be obtained when the cam angle $\theta$ is chosen to satisfy $\mu < \tan \theta$, where $\mu$ is a friction coefficient between the clutch disk and the cam member.

On the basis of the above described observation, it is proposed to install two cam mechanisms, one for obtaining the self-tightening engagement and one for obtaining the boosting engagement, i.e. to install a self-tightening cam and a boosting cam in one clutch device, and thereby obtain a self-tightening action when the members relatively rotates in one direction and obtain a boosting action when the members relatively rotates in a direction reverse to the one direction.

Hereafter, the relative rotation of the member by which the self-tightening cam generates the thrust force for the self-tightening engagement is called the normal rotation, or rotation in the normal direction. On the other hand, the relative rotation of the member by which the boosting cam generates the thrust force for the boosting engagement is called the reverse rotation, or rotation in the reverse direction.

However, the above described clutch device generates unnecessary thrust force which causes a frictional loss when releasing the clutch device rotating in the reverse direction, unless the clutch disk and the cam member are separated from each other in an instant.

Therefore, a return spring is attached to give a biasing force for separating the clutch disk and the cam member from each other.

However, the biasing force of the return spring decreases the thrust force generated by the self-tightening cam.

Accordingly, the clutch device will slip before the direction of the torque is reversed when the torque is relieved from the engaging state at the rotation in the normal direction. The slip of the clutch device causes poor driveability, such as a sudden increase of engine speed, due to a sudden decrease of engine load.

SUMMARY OF THE INVENTION

Therefore, an object of the present invention is to solve the above drawbacks of the prior art devices and to provide a clutch device with a cam mechanism which can obtain sure self-tightening engagement of the members when the members rotate in one direction and also obtain sure free rotation of the members when the members rotate in a reverse direction.

The above object is obtained by a clutch device according to the present invention, which comprises a pair of members disposed at a distance on a common axis and relatively rotating to each other around the common axis; a cam mechanism disposed on the common axis and composed of a first cam mechanism and a second cam mechanism, the first cam mechanism being composed of a pair of cam members and generating an axial thrust force corresponding to rotational torque in order to engage the pair of members after being pushed by a pushing means to one of the pair of members rotating in a direction and thereby causing a frictional engagement of one of the pair of cam members with the one of the pair of members rotating in the direction, and the second cam mechanism being composed of a pair of cam members and generating an axial thrust force corresponding to a pushing force of the pushing means in order to engage the pair of members after being pushed by the pushing means to one the pair of members rotating in a direction reverse to the direction in which the first cam mechanism generates the axial thrust force corresponding to rotational torque and thereby causing a frictional engagement of one of the pair of cam members with the one of the pair of members rotating in the reverse direction; and a biasing means for supplying a biasing force acting on the cam mechanism in a direction contrary to a direction of the pushing force of the pushing means, wherein the axial thrust force generated by the first cam mechanism is kept free from being weakened by the biasing force supplied by the biasing means.

The present invention will be described in more detail below with reference to the preferred embodiments illustrated in the attached drawings.

BRIEF DESCRIPTION OF THE DRAWINGS

In the drawings:

FIG. 2 is a table for obtaining various driving speeds;

DESCRIPTION OF THE PREFERRED EMBODIMENTS

Figure 1:
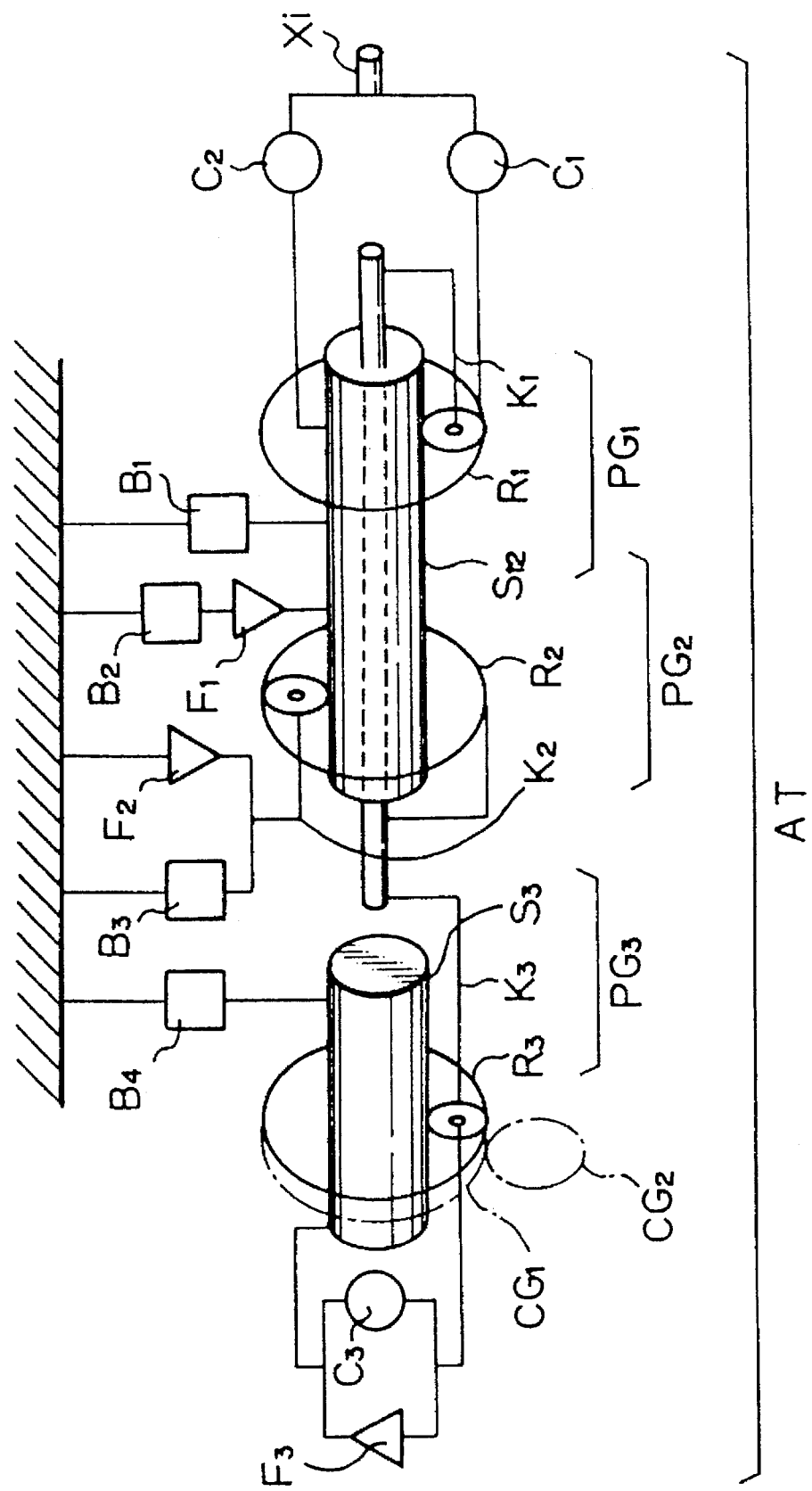
FIG. 1 is a schematic view illustrating an overall structure of an automatic transmission to which the present invention is applied.

FIG. 1 schematically illustrates an overall structure of an automatic transmission for the purpose of explaining where an embodiment of the present invention is used in the automatic transmission.

In the figure, AT generally represents an automatic transmission which basically comprises three sets of planetary gear units and plural frictional engagement devices for engaging and disengaging ring gears, sun gears, carriers composing the planetary gear units to and from each other, the details thereof being as follows:

$X_1$ represents an input shaft and connected with an output shaft (not shown) of a torque converter (not shown);

$PG_1$, $PG_2$ and $PG_3$ represent a front planetary gear unit, a rear planetary gear unit and an O/D planetary gear unit, respectively;

$R_1$, $R_2$ and $R_3$ represent a front planetary ring gear, a rear planetary ring gear and an O/D planetary ring gear, respectively;

$K_1$, $K_2$ and $K_3$ represent a front planetary carrier, a rear planetary carrier and an O/D planetary carrier, respectively;

$S_{12}$ represents a front and rear planetary sun gear common to the front and rear planetary gear units, and $S_3$ represents an O/D planetary sun gear;

$C_1$ represents a first clutch for engaging and disengaging the input shaft $X_1$ to and from the front planetary ring gear $R_1$;

$C_2$ represents a second clutch for engaging and disengaging the input shaft X, to and from the front and rear planetary sun gear $S_{12}$;

$C_3$ represents a third clutch for engaging and disengaging the O/D planetary carrier $K_3$ to and from the O/D planetary sun gear $S_3$;

$B_1$ represents a first brake for selectively locking a clockwise or counterclockwise rotation (seeing from the input shaft $X_1$) of the front and rear planetary sun gear $S_{12}$;

$B_2$ represents a second brake for locking a counterclockwise rotation of the front and rear planetary sun gear $S_{12}$;

$B_3$ represents a third brake for locking a clockwise or counterclockwise rotation of the rear planetary carrier $K_2$;

$B_4$ represents a fourth brake for locking a clockwise or counterclockwise rotation of the O/D planetary sun gear $S_3$;

$F_1$ represents a first one-way clutch for locking a counterclockwise rotation of the front and rear planetary sun gear $S_{12}$ when the second brake $B_2$ is operated; and $F_2$ represents a second one-way clutch for locking a counterclockwise rotation of the rear planetary carrier $K_2$.

$F_3$ represents a third one-way clutch for locking a counterclockwise rotation of the O/D planetary carrier $K_3$ relative to the O/D planetary sun gear $S_3$;

$CG_1$ and $CG_2$ represent a counter drive gear and a counter driven gear, respectively, which transmit the engine torque to a post-stage mechanism but have no relation to speed changing.

The table shown in FIG. 2 shows a combination of the engagement and disengagement of frictional engagement elements to attain desired speeds at each range and gear speed.

The embodiments described later are adopted to perform the work of the third brake $B_3$ and the second one way clutch $F_2$.

Therefore, by referring to the table shown in FIG. 2, the embodiments are required to perform the following operations;

Locking the reverse rotation of the rear planetary carrier $K_2$ in normal running (vehicle is driven by engine power) with the first speed of D, 2, and L range;

Locking the normal rotation of the rear planetary carrier $K_2$ while coasting (vehicle is driven by inertia force) with the first speed of L range;

Locking the normal rotation of the rear planetary carrier $K_2$ in normal running with the R range;

Locking the reverse rotation of the rear planetary carrier $K_2$ while coasting with the R range;

Releasing the locking of the rear planetary carrier $K_2$ simultaneously with changing the direction of torque of the rear planetary carrier $K_2$ during up-shift from the first speed to the second speed; and Locking the rear planetary carrier $K_2$ simultaneously with changing the direction of torque of the rear planetary carrier $K_2$ while down-shifting from the second speed to the first speed.

Figure 3:
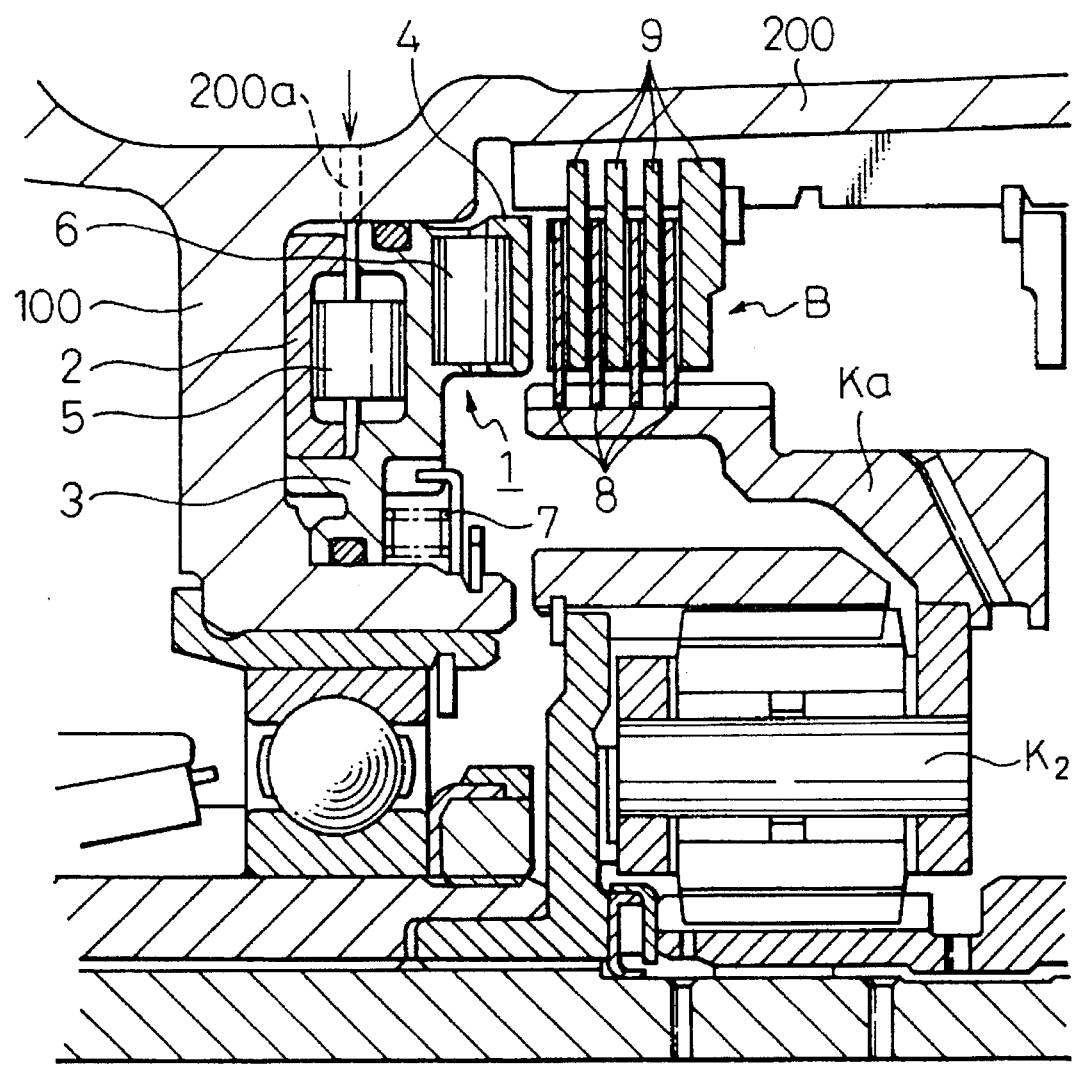
FIG. 3 is a side sectional view of the first embodiment.

FIG. 3 illustrates a side sectional view of an automatic transmission to which a first embodiment of the present invention is built in, wherein clutch casing 100 which has an annular recess in which clutch device according to the present invention is disposed is integrally formed with transmission case 200. A first cam member 2, a piston 3 and a second cam member 4 are disposed in the annular recess of the clutch casing 100.

A first cam roller 5 is disposed between the first cam member 2 and the piston 3, and the second cam roller 6 is disposed between the second cam member 4 and the piston 3. The piston 3 is always forced to the left in the figure by a return spring 7.

The first cam member 2 can be formed integrally with the clutch casing 100 instead of being formed separated from the clutch casing 100 as in this first embodiment. A oil passage 200a for supplying a oil pressure to the piston 3 is formed in the transmission case 200.

A clutch disks 8 are axially slidably attached to a connecting member Ka which rotates with the rear planetary carrier $K_2$ of the rear planetary gear $PG_2$, and separator plates 9 are axially slidably attached to the transmission case 200.

The clutch disks 8 and the separator plates 9 are engaged to each other when the clutch device 1 is axially elongated and pushed to the right end one of the separator plates 9, thereby the clutch disks 8 are stopped and the rear planetary carrier $K_2$ is locked.

Figure 4:
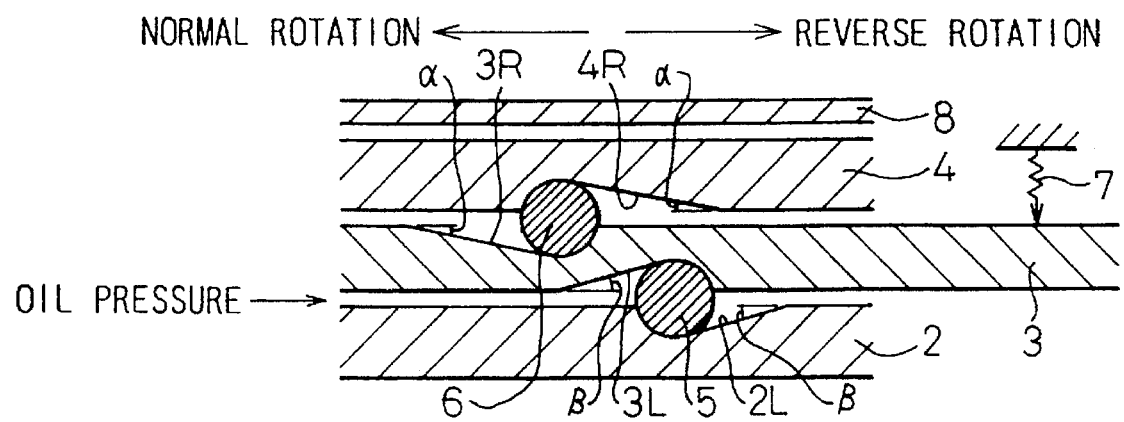
FIG. 4 is a view for illustrating an overall structure of a cam mechanism of the first embodiment.
Figure 5:
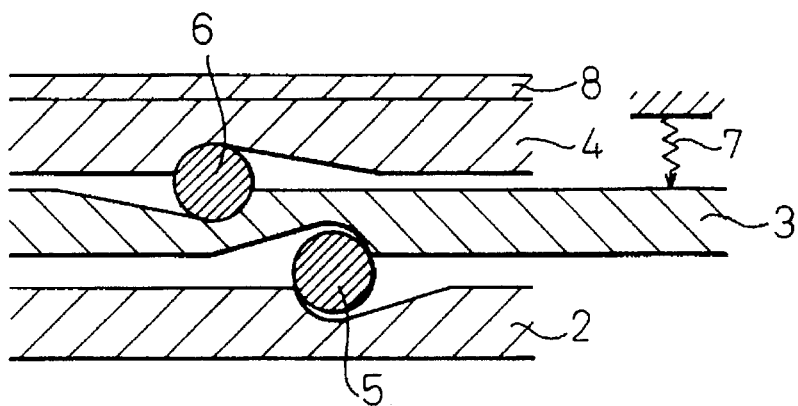
FIGS. 5 to 7 are views for illustrating an operation of the cam mechanism of the first embodiment.

FIG. 4 is a sectional view of the clutch device 1 shown in FIG. 3 from the radial direction.

A paired cam surface 2L and 3L are respectively formed on a opposing surface of the first cam member 2 and the piston 3, and a paired cam surface 3R and 4R are respectively formed on a opposing surface of the second cam member 4 and the piston 3. Therefore, the piston 3 has cam surfaces on both axial end surfaces.

The cam angle $\alpha$ of the cam surfaces 3R and 4R, and the cam angle $\beta$ of the cam surfaces 2L and 3L are chosen to satisfy the following equation;

$$\tan \alpha < \mu \text{ and } \tan \beta > \mu,$$

where $\mu$ is a frictional coefficient between the second cam member 4 and the clutch disk 8.

Here, if described as "the clutch disk 8" i.e. described in singular form, it means the left end one of the clutch disks 8 in the figure, and if described as "the clutch disks 8" i.e. described in plural form, it means the all set of the clutch disks 8 in the figure.

The clutch disks 8 rotate with rear planetary carrier $K_2$, when the clutch device 1 does not operate and shown to move right or left in the figure.

Here, we prescribe the rotation of clutch disk 8 which is shown to move to the left in relation to the cam members in the FIG. 4 and like drawn figures as normal rotation because this rotation can cause the self-tightening engagement. On the other hand, the rotation of clutch disk 8 which is shown to move to the right in relation to the cam members in the FIG. 4 and like drawn figures is prescribed as the reverse rotation because this rotation can cause the boosting engagement.

The state shown in FIG. 4 is the state having the shortest axial length of the clutch device 1, wherein the clutch disk 8 and the second cam member 4 are not contacting to each other, and accordingly the clutch disks 8 may not be stopped regardless of the direction of the rotation.

When the oil pressure is supplied during the normal rotation, the distance between the first cam member 2 and the piston 3 will increase, so that the piston 3 and the second cam member 4 are pushed to the clutch disk 8 holding the cam roller 5 therebetween.

As a result, the second cam member 4 and the clutch disk 8 are frictionally engaged to each other so that the second cam member 4 are dragged by the clutch disk 8 and begins rotation in the normal direction with clutch disk 8.

Since cam angle $\alpha$ is chosen to satisfy $\tan \alpha < \mu$, the cam surface 4R of the second cam member 4 climbs the cam surface 3R of the piston 3 through the second cam roller 6, and cam thrust force is generated.

Thereby, the piston 3 is pushed back downward in the figure, and the once increased distance between the first cam member 2 and the piston 3 is decreased to the minimum, so that the first cam member 2 receives the reaction force of the above generated thrust force.

Accordingly, the second cam member 4 and the clutch disk 8 are self-tighteningly engaged.

This self-tightening engagement increases a force of engagement relative to a increase of the rotational torque input by the clutch disk 8.

Figure 6:
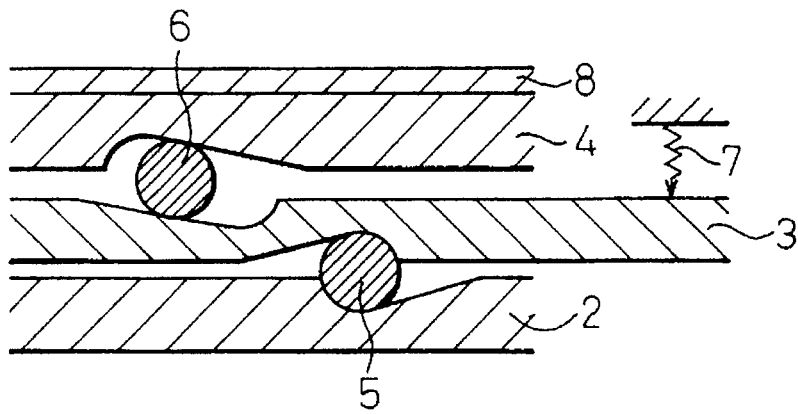

FIG. 6 illustrates thus self-tighteningly engaged state. As a result, rear planetary carrier $K_2$ is locked when the clutch disk 8 is going to rotate normally.

Figure 7:
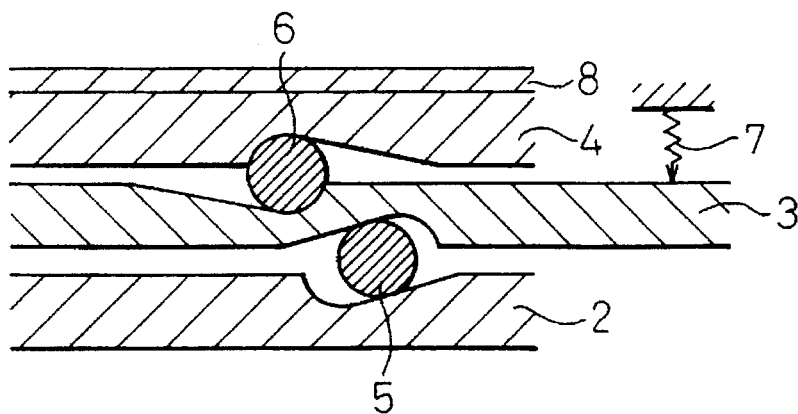

On the other hand, when a oil pressure is supplied during the reverse rotation of the clutch disk 8, the second cam member 4 and the clutch disk 8 are frictionally engaged to each other, so that the second cam member 4 starts reverse rotation by being dragged with the clutch disk 8. Accordingly, the piston 3 also starts the reverse rotation through the second cam roller 6, so that the cam surface 3L of the piston 3 climbs the cam surface 2L of the first cam member 2 through the first cam roller 5. Thereby, cam thrust force is generated. As a result, the second cam member 4 and the clutch disk 8 are engaged by the cam thrust force, as shown in FIG. 7.

Thus, rear planetary carrier $K_2$ can be locked when the clutch disk 8 is going to rotate in the reverse direction.

The above described engagement is a boosting engagement which boosts the thrust force by oil pressure.

The engaging force F of the clutch device 1 of the above described engagement is a sum of the cam thrust force and the force by oil pressure as indicated in the following equation, and changes in relation to the oil pressure.

$$F = a(Fp - Fs) \tag{1}$$

wherein, Fp is the force by oil pressure,
Fs is a biasing force of return spring 7,
a is a constant decided by the cam angle $\beta$ which is chosen to satisfy $\tan \beta > \mu$.

Therefore, the engagement force F will expire when the force Fp by oil pressure becomes smaller than the biasing force Fs of return spring 7 and the engagement is released.

As described above, by the first embodiment the biasing force of the return spring 7 does not act on the second cam member 4, and the self-tightening engagement can be surely obtained when the clutch disks 8 rotates in the normal direction, and free rotation of the clutch disks 8 in the reverse direction can be obtained without generating drag.

Thus, the first embodiment can substitute for the work which is performed by the third brake $B_3$ and the second one-way clutch $F_2$ in the prior art.

Figure 8:
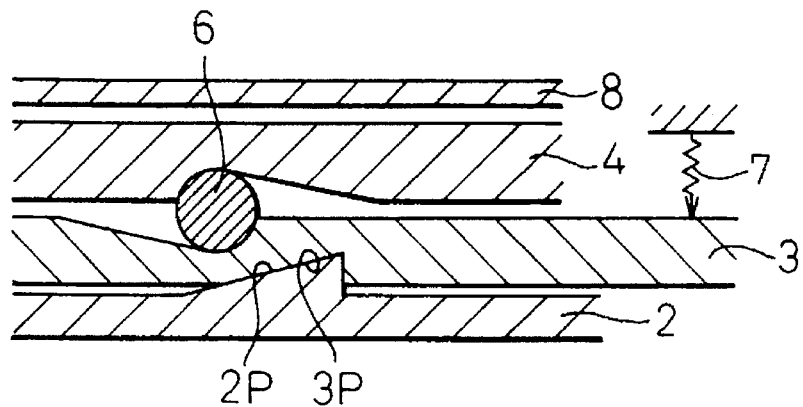
FIG. 8 is a view for illustrating a structure of a cam mechanism of the first embodiment.

FIG. 8 shows the cam mechanism of the second embodiment, in which the cam surface 2P of the first cam member 2 and the cam surface 3P of the piston 3 are formed without a rounding surface. Other parts are same as those of the first embodiment.

By introducing this feature, the first cam roller 5 which is required in the first embodiment is deleted thereby the axial length can be decreased, and a pressure per unit area acting on the cam surface is decreased.

The operation of the second embodiment is same as the case of the first embodiment, therefore no detail description is provided.

Figure 9:
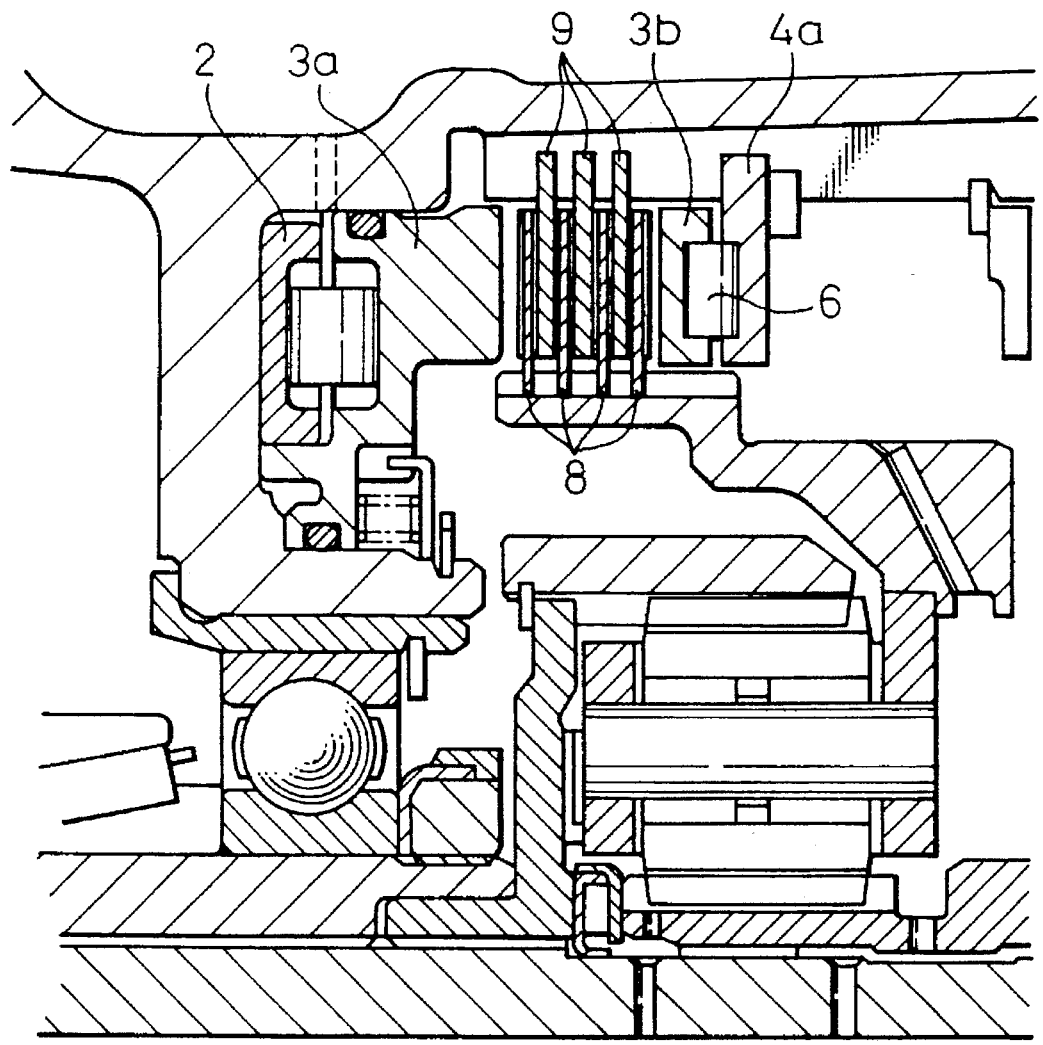
FIG. 9 is a view for illustrating an overall structure of the third embodiment.

FIG. 9 shows a construction of the third embodiment. As shown in FIG. 9, a cam mechanism for generating engagement force when clutch disk 8 rotates in the normal direction and a cam mechanism for generating engagement force when clutch disk 8 rotates in the reverse direction are separately disposed.

Therefore, on a surface of the piston 3a facing to the clutch disk 8 only a surface for frictional engagement is formed, while on a surface facing to the first cam member 2 a cam surface same as 3L in the first embodiment is formed.

The clutch disks 8 and the separator plates 9 are disposed between the piston 3a and the second cam member 3b with the third cam member 4a.

Cam surfaces similar to 3R and 4R in the first embodiment are formed on the opposing surfaces of the second cam member 3b and the third cam member 4a holding a second cam roller 6 therebetween.

When a oil pressure is supplied, the piston 3a moves to the right in the figure and pushes the clutch disks 8. However, no engagement occur until a cam thrust force is generated.

Figure 10:
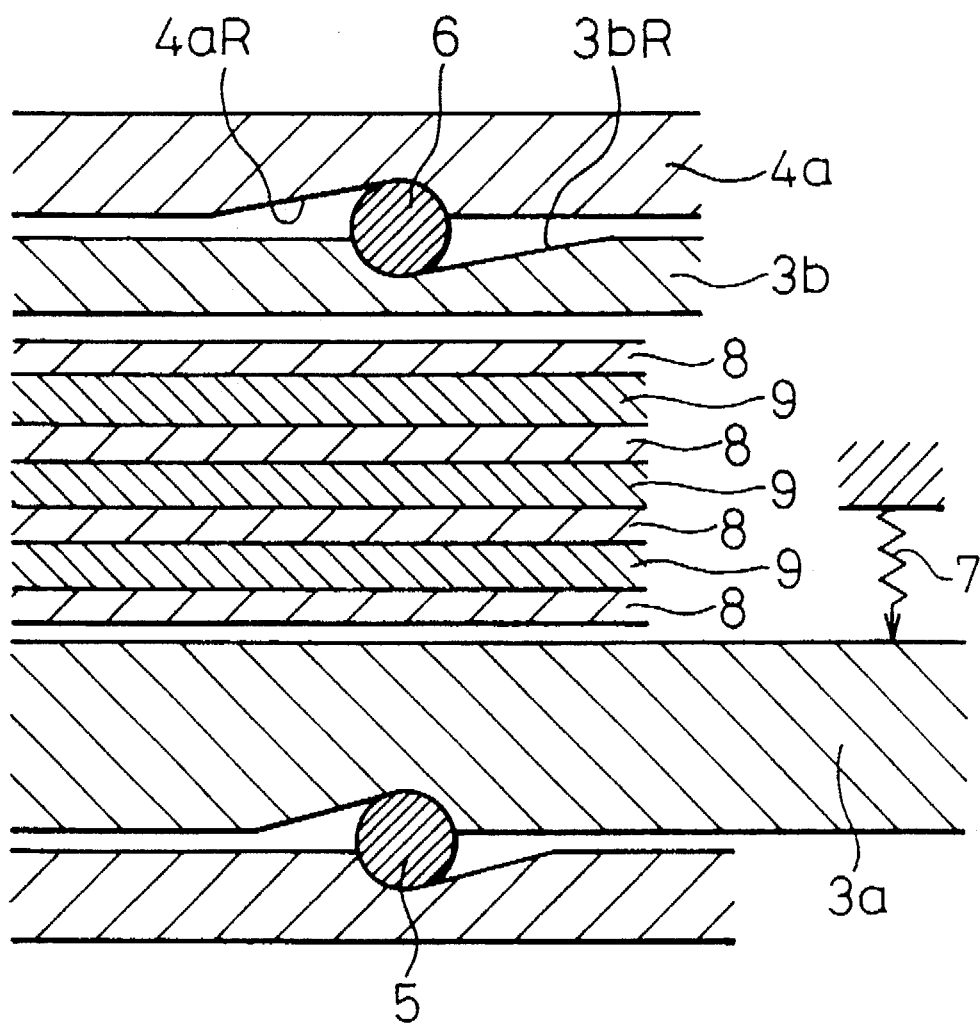
FIG. 10 is a view for illustrating a structure of a cam mechanism of the third embodiment.

FIG. 10 is a sectional view of the third embodiment viewing from the radial direction same as FIG. 4.

In FIG. 10, the cam surface 3bR formed on the second cam member 3b and the cam surface 4aR are slanted in the opposite direction to the cam surfaces 3R and 4R which are formed on the piston 3 and the first cam member 4 in the first embodiment, since the clutch disk 8 engages with the back surface of the second cam member 3b.

The operation of the third embodiment is fundamentally same as the one of the first embodiment, therefore no detail description is provided.

This third embodiment has an advantage that it is adaptable to a case in which the clutch casing 100 and the clutch disks 8 are so closely disposed that cam mechanism can not be located therebetween.

Figure 11:
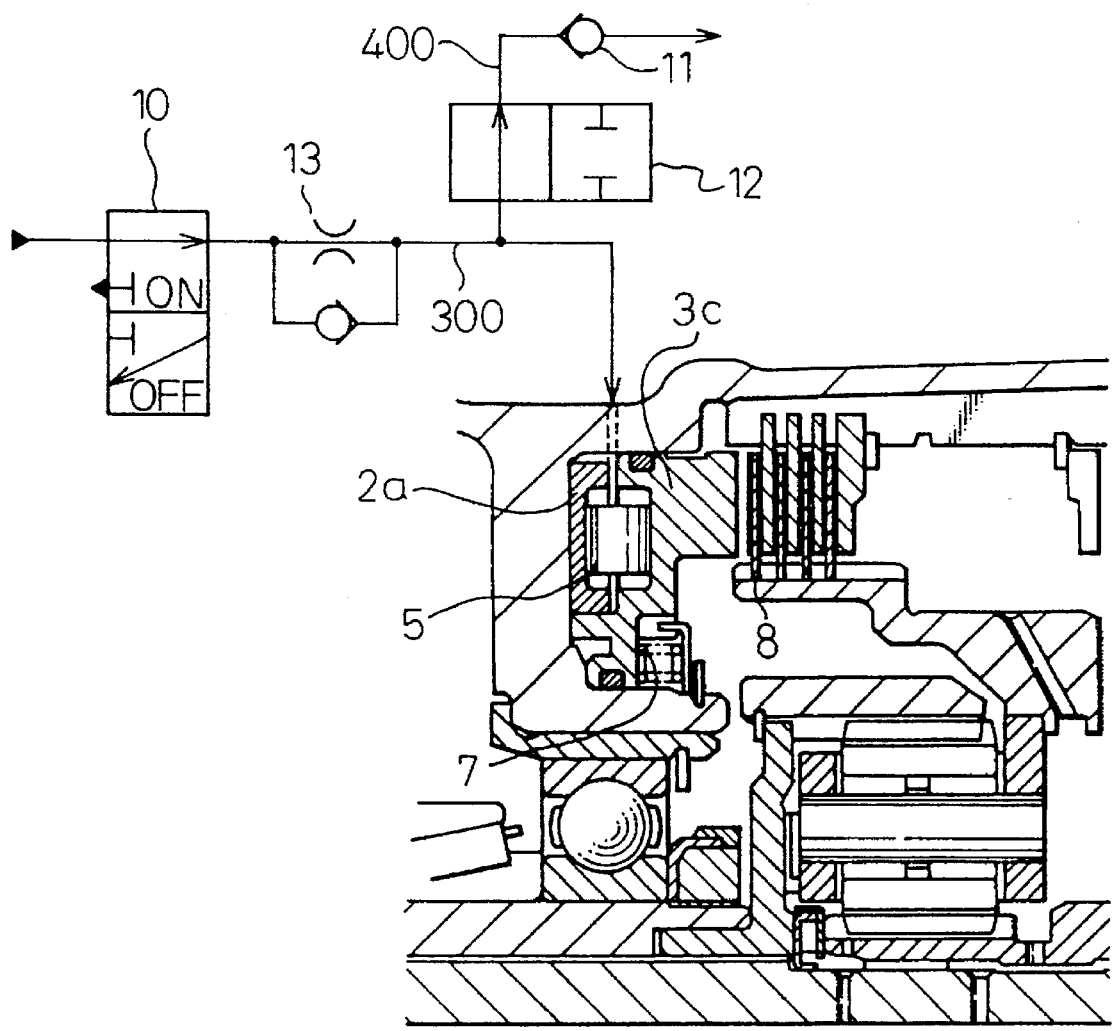
FIG. 11 is a view for illustrating an overall structure the fourth embodiment.

FIG. 11 shows a construction of the fourth embodiment in which oil pressure sufficient to compensate the bias force of the return spring is supplied.

The oil pressure is supplied to the clutch device 1 by turning ON a shift valve 10 which is located on an oil passage 300 which connects an oil pressure source (not shown) and the oil passage 200a formed in the transmission case 200.

In this fourth embodiment, an oil passage 400 for introducing the oil pressure to a check valve 11 from a midpoint between the shift valve 10 and the oil passage 200a is disposed. Further, drain control valve 12 is disposed in a series at a midpoint of the oil passage 400. An orifice 13 regulates the flow rate of the oil for supplying the oil pressure.

Therefore, an oil pressure regulated to be a preset pressure of the check valve 11 is supplied to the clutch device 1, and no higher oil pressure is supplied.

Figure 12:
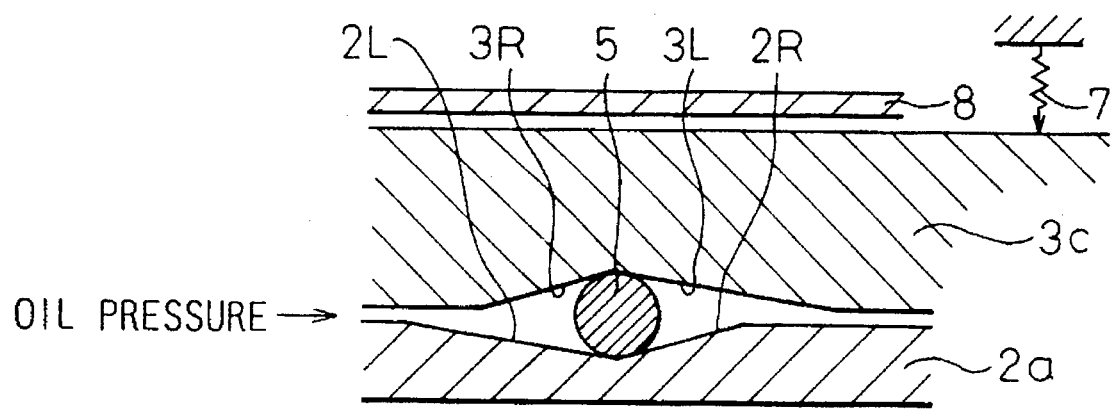
FIG. 12 is a view for illustrating a structure of a cam mechanism of the third embodiment.

The cam mechanism of this fourth embodiment is constructed as shown in FIG. 12, in which cam surfaces 2L and 2R for engaging in normal rotation of clutch disks 8, and cam surfaces 3L and 3R for engaging in reverse rotation of clutch disks 8 are continuously formed on opposing surfaces of the first cam member 2a and the piston 3c, as in the first embodiment.

Here, the preset pressure of the check valve 11 is chosen to a value attained by dividing the bias force of the return spring 7 when the return spring 7 is compressed to cause the initial frictional engagement, by a pressure receiving area of the piston 3c.

When oil pressure is supplied by turning ON the shift valve 10, after presetting the pressure of the check valve 11 as above described, the initial frictional engagement is caused, and accordingly a cam thrust force is generated and a self-tightening engagement is performed. In this operation the biasing force of the return spring 7 is compensated, therefore the engagement is securely attained.

When the clutch disks 8 rotate in the reverse direction keeping the supply of the oil pressure, the clutch disks 8 will rotate freely, since the oil pressure only for compensating for the biasing force of the return spring is supplied and no thrust force for causing the engagement is generated, as is apparent from the equation (1).

As described above, the self-tightening engagement can be surely obtained by the fourth embodiment when the clutch disks 8 rotates in the normal direction, and free rotation of the clutch disks 8 in the reverse direction can be obtained without generating drag.

Thus, the fourth embodiment can substitute for the work which is performed by the third brake $B_3$ and the second one-way clutch $F_2$ in the prior art.

Figure 13:
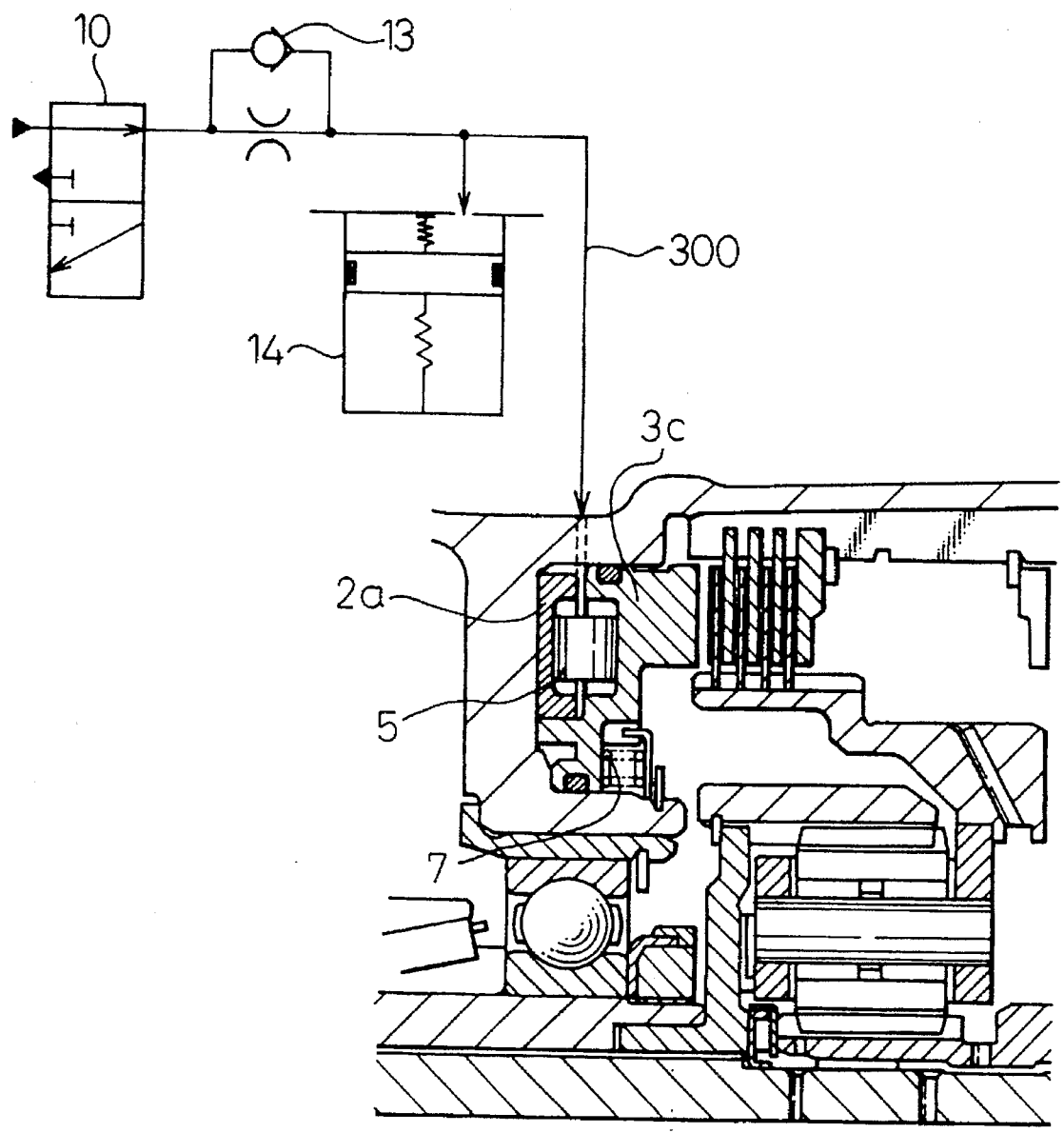
FIG. 13 is a view for illustrating an overall structure of the fifth embodiment.

FIG. 13 shows a construction of the fifth embodiment which is obtained by modifying the fourth embodiment by replacing the check valve 11 with an accumulator 14. The accumulator 14 can decrease the oil pressure to a predetermined value during a predetermined period. Thereby, oil pressure suitable for compensating the biasing force of the return spring 7 is supplied during the working period of the accumulator 14.

When the accumulator 14 is not working, the value of the oil pressure supplied to the clutch device 1 is same as the value at the outlet of the shift valve 10.

On down-shifting from the second speed to the first speed, it is required to engage the clutch device 1 at the same time the change of the direction of rotation of the rear planetary carrier $K_2$, i.e. rotation of the clutch disks 8, from the reverse direction to the normal direction.

The supply of oil pressure is started by turning ON the shift valve 10. However, engagement will not occur when the clutch disks 8 rotate in the reverse direction, since oil pressure, corresponding to only compensating for the biasing force of the return spring 7, is supplied during the predetermined period by the action of the accumulator 14 which is preset as described above.

Thus, an engagement at the rotation in the reverse direction will not occur, even if the clutch disks 8 remain rotating in the reverse direction.

By changing the direction of rotation of the clutch disks 8 from reverse to normal during the working of the accumulator 14, the cam force will occur as in the first embodiment and self-tightening engagement will be surely attained.

As described above, by the fifth embodiment the self-tightening engagement can be surely obtained when the clutch disks 8 rotates in the normal direction, and free rotation of the clutch disks 8 in the reverse direction can be obtained without generating drag.

Thus, the fifth embodiment can surely substitute for the work which is performed by the third brake $B_3$ and the second one-way clutch $F_2$ in the prior art.

In the sixth embodiment a spring seat is disposed between piston and return spring for preventing the biasing force of the return spring from acting on the piston during the self-tightening engagement.

Figure 14:
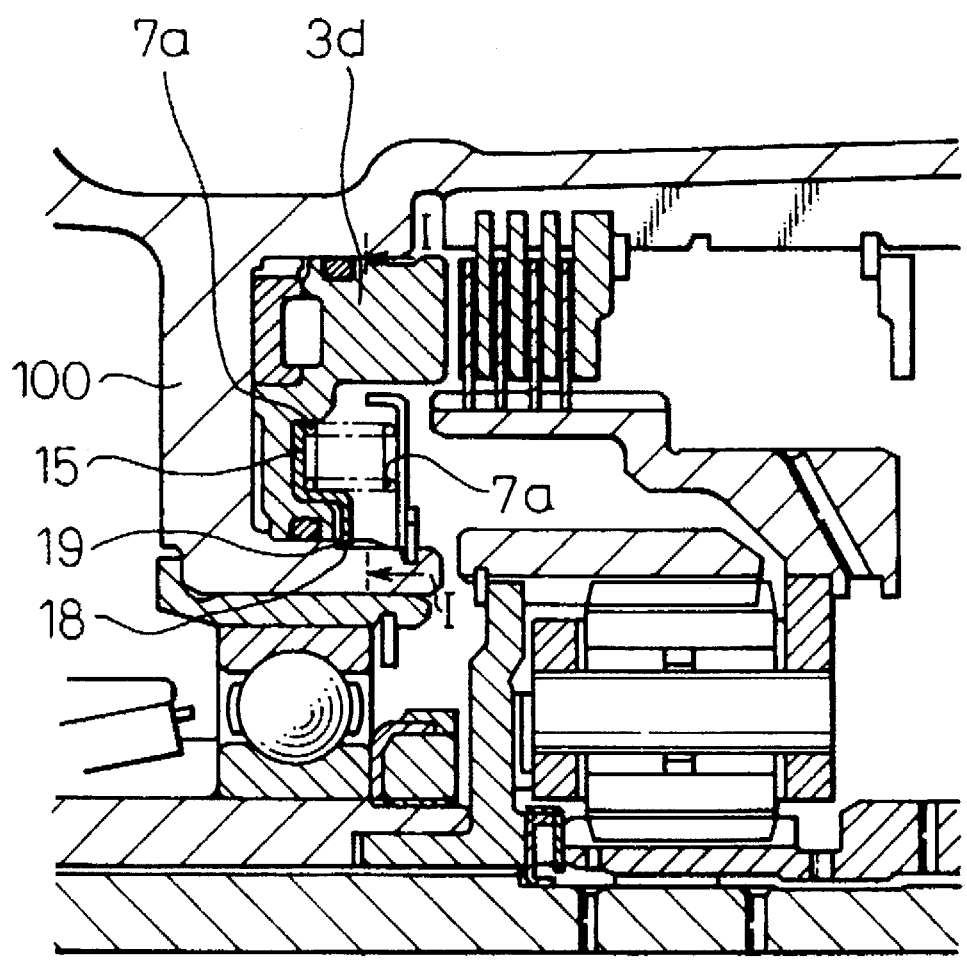
FIG. 14 is a view for illustrating an overall structure of the sixth embodiment.
Figure 15:
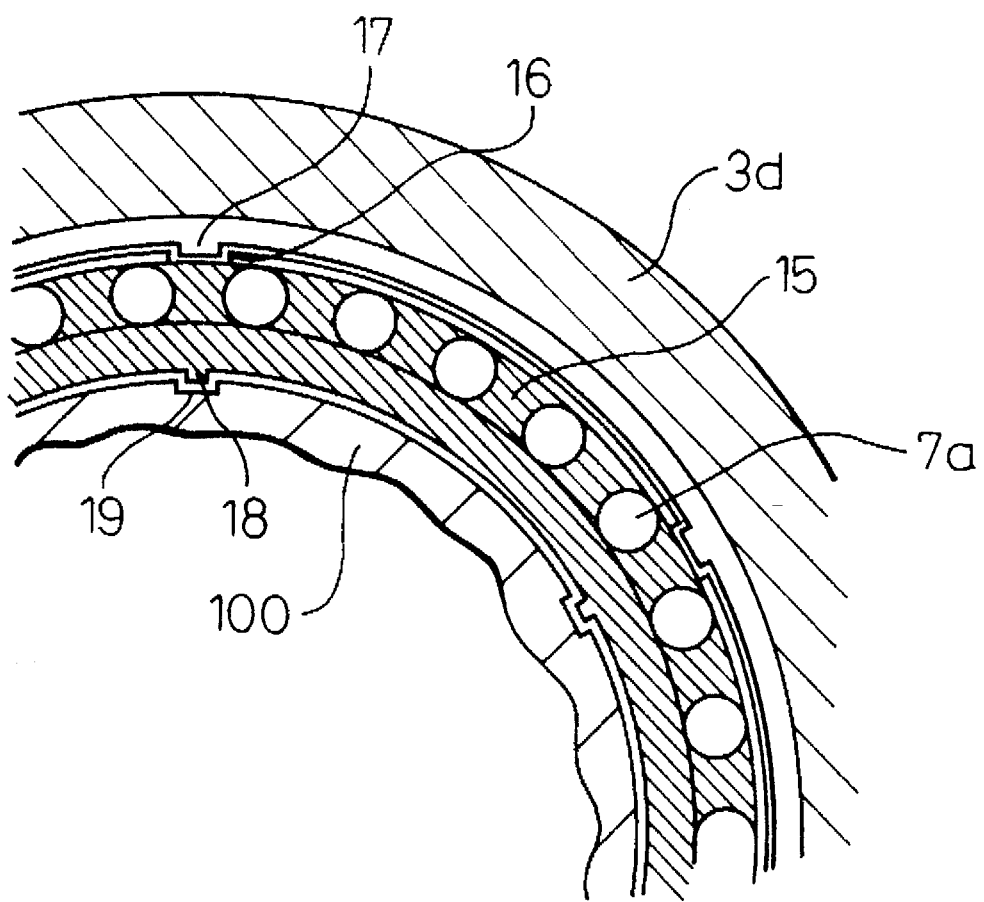
FIG. 15 is a sectional view taken along the line I—I of FIG. 14.

FIG. 14 is a sectional view showing a construction of the sixth embodiment and FIG. 15 is a sectional view taken along line I—I of the FIG. 14. The cam, the clutch disks and the separator plates used in the sixth embodiment is same as those used in the fourth and fifth embodiments, therefore the same reference numbers as used in the fourth and fifth embodiments are given to these parts in the figures.

As shown, a spring seat 15, which is disposed between return spring 7a and the piston 3d, has recesses 16 on an outer spherical surface and projections 17 on an inner spherical surface. The recesses 16 axially slidably engage with projections 18 formed on the piston 3d, and the projections 17 engage with recesses 19 formed on the guide groove 19 formed on the clutch casing 100 for limiting the movement of the spring seat 15.

Figure 16:
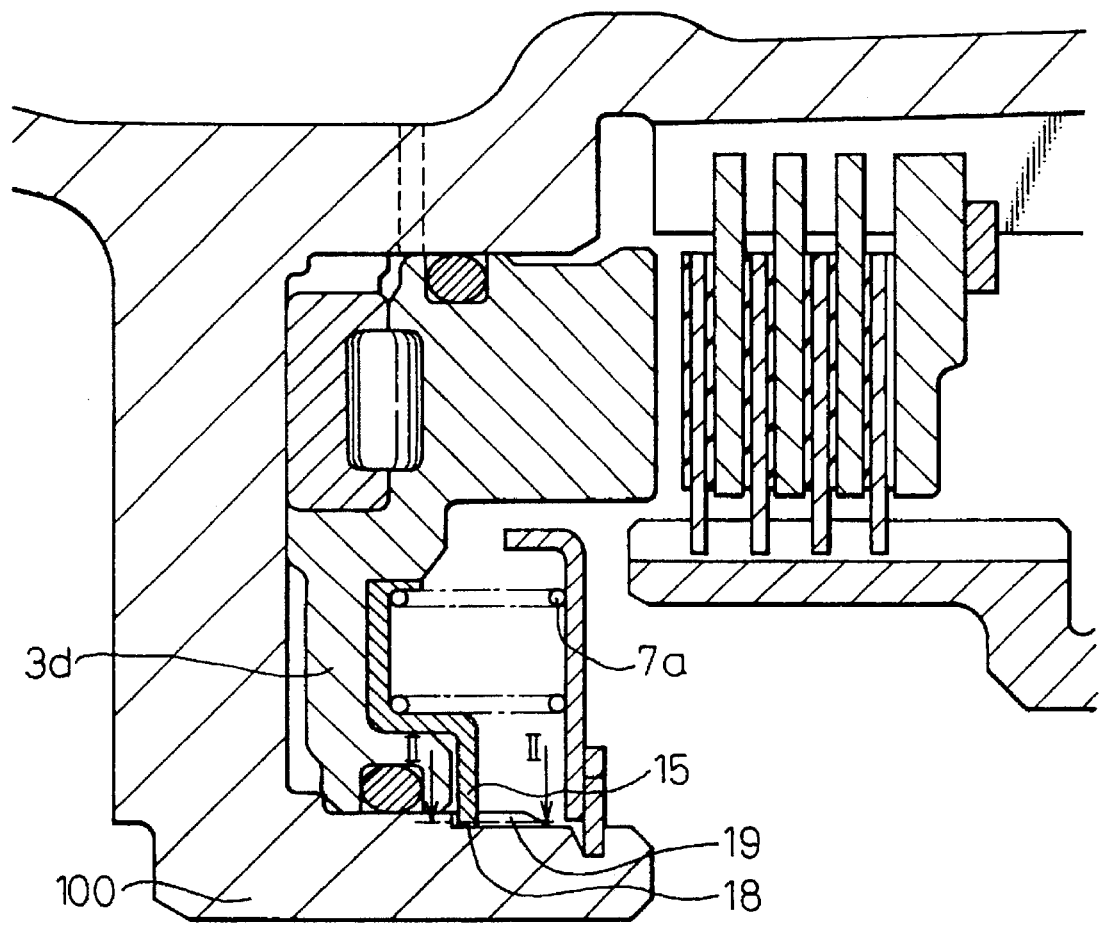
FIG. 16 is a view for illustrating an operation of the cam mechanism of the sixth embodiment.
Figure 17:
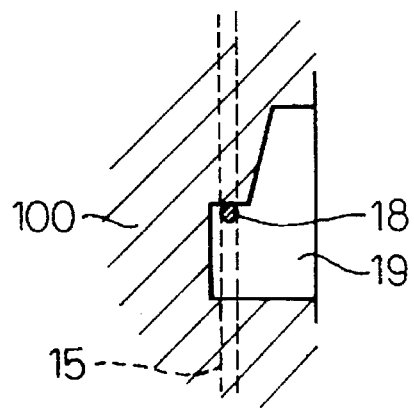
FIG. 17 is a sectional view taken along the line II—II of FIG. 14.

FIG. 16 shows a position of piston 3d and a position of the spring seat 15 when clutch disks 8 rotate freely in the normal direction with no oil pressure supplied to the piston 3d. FIG. 17 is a view from the outside to the center of the clutch casing 100 showing the relative position of one of the projections 18 of the spring seat 15 to one of the guide grooves 19 of the clutch casing 100.

Figure 18:
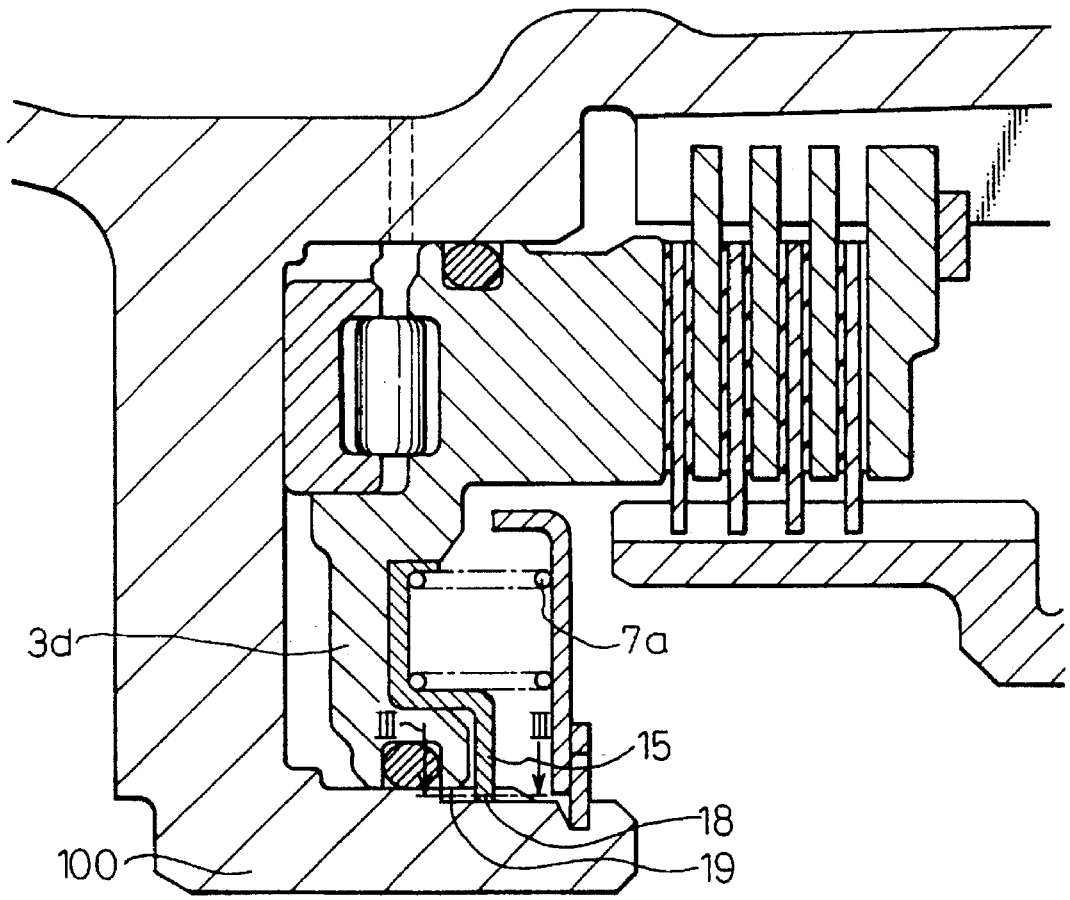
FIG. 18 is a view for illustrating an operation of the cam mechanism of the sixth embodiment.

The piston 3d will move to the right in the figure and contact with clutch disk 8 so that a frictional engagement is initiated when the oil pressure is supplied on the above described state. Shown in FIGS. 18 and 19 are a state just before beginning of frictional engagement.

Figure 19:
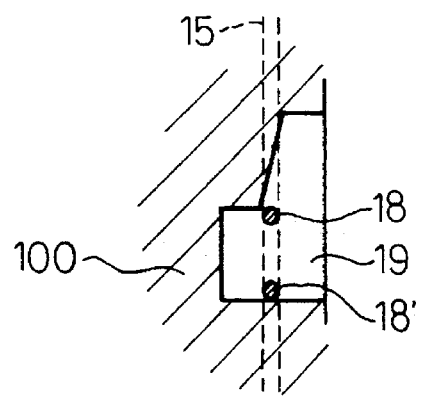
FIG. 19 is a sectional view taken along the line III—III of FIG. 18.

In this state, the piston 3d and the spring 15 contact each other, and the projection 18 of the spring 15 and the guide recess 19 of the clutch casing 100 are positioned as shown in FIG. 19. As apparent from FIG. 19, in this state the spring seat 15 is not restrained by the guide recess 19.

When the clutch disk 8 and the piston 3d are frictionally engaged to each other, the piston 3d rotates in the normal direction by being dragged by the clutch disk 8.

At the same time, the spring seat 15 also rotates in the normal direction by being dragged with the piston 3d.

Therefore, the projection 18 of the spring seat 15 will move upward in the figure from the position shown in FIG. 19.

Wherein, the edge of the guide recess 19 is shaped to slant to the right as extending upward in the figure. Therefore, the projection 18 of the spring seat 15 shifts to the right in the figure and moves upward.

Figure 20:
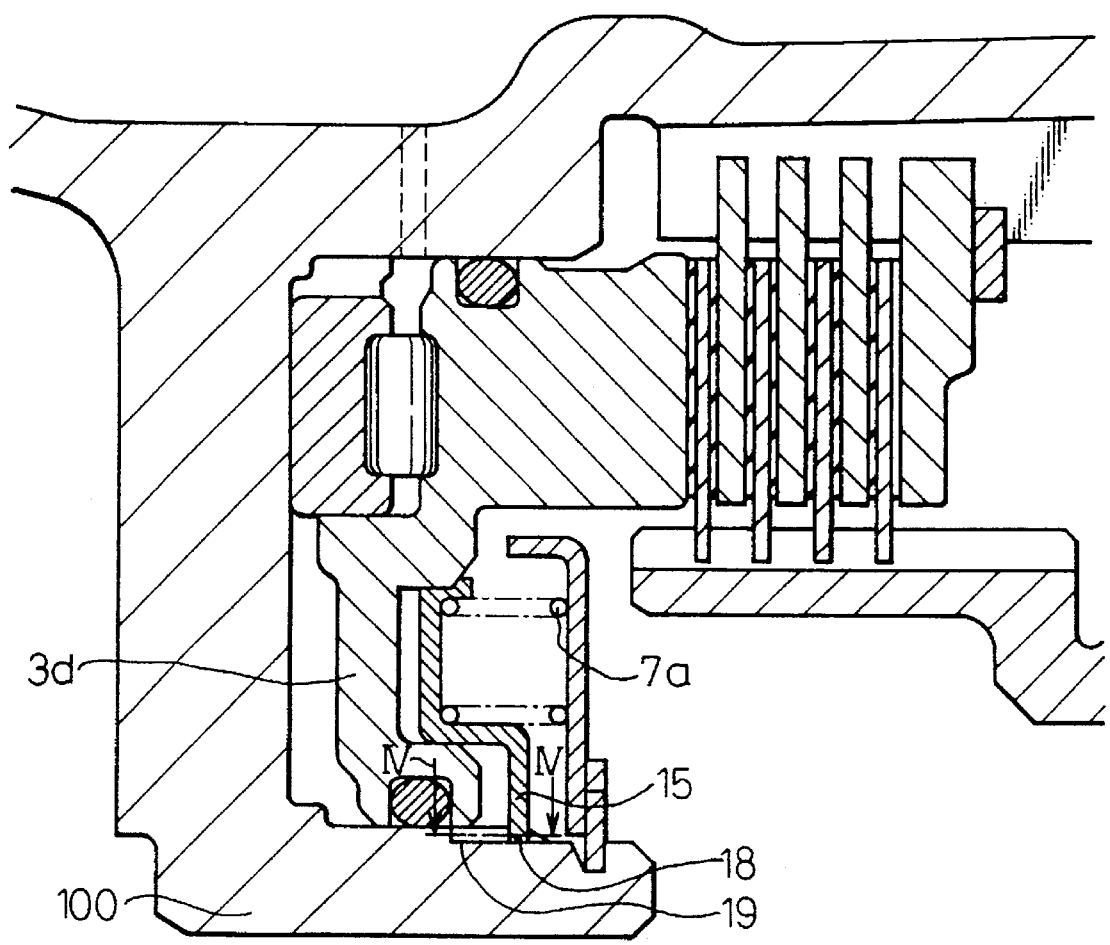
FIG. 20 is a view for illustrating an operation of the cam mechanism of the sixth embodiment.
Figure 21:
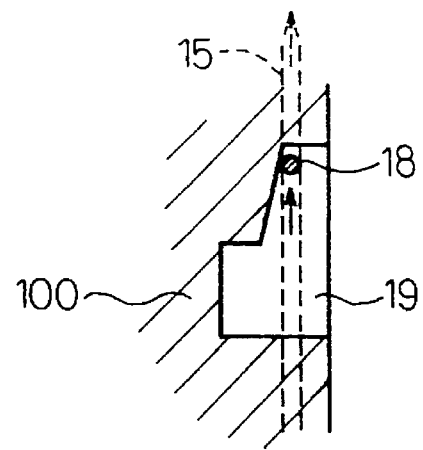
FIG. 21 is a sectional view taken along the line IV—IV of FIG. 20.

Accordingly, the spring seat 15 will separate from the piston 3d and no biasing force of the return spring 7a will act on the piston 3d. Thus, the self-tightening engagement is performed without effected by the biasing force of the return spring 7a. FIG. 20 and 21 show a state of engagement obtained as described above.

On the other hand, when the boosting engagement is carrying out during reverse rotation of the clutch disks 8, the projection 18 of the spring seat 15 contacts an edge of the guide recess 19 which extends in the axial direction as shown by 18' in FIG. 19. Therefore, the axial position of the spring seat 15 cannot be changed any more and piston 3d and the spring seat 15 are kept in contact.

When the oil pressure is released on the above described state, the piston 3d will move to a neutral position and the clutch disks 8 can freely rotate in the reverse direction.

As described above, the self-tightening engagement can be surely obtained by the sixth embodiment when the clutch disks 8 rotate in the normal direction, and free rotation of the clutch disks 8 in the reverse direction can be obtained without generating drag.

Thus, the sixth embodiment can surely substitute for the work which is performed by the third brake $B_3$ and the second one-way clutch $F_2$ in the prior art.

Now the seventh embodiment will be described with reference to FIGS. 22 and 23. The seventh embodiment has a return spring which can retract when the piston and the clutch disk are self-tighteningly engaged, and thereby no biasing force can act on the piston in the state of self-tightening engagement.

Figure 22:
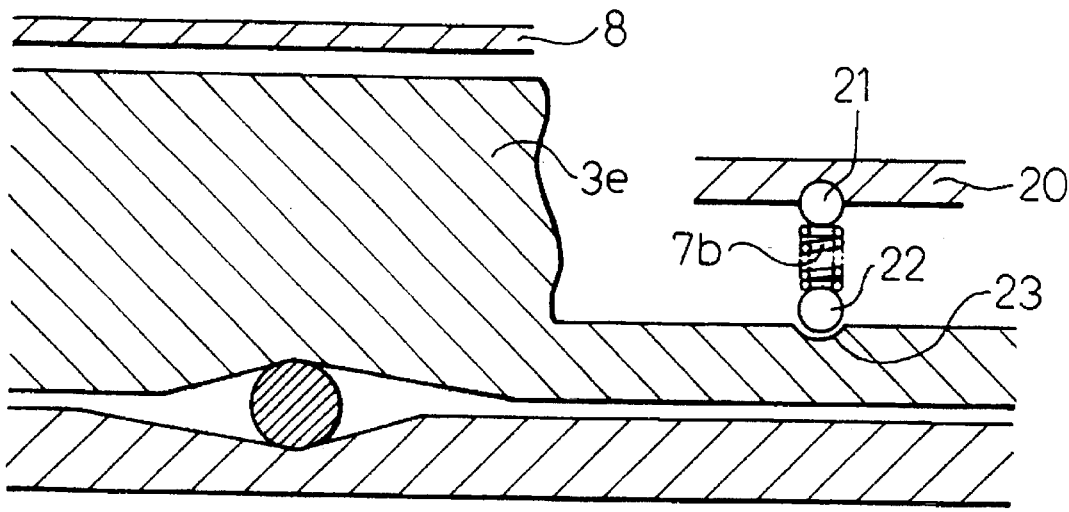
FIGS. 22 and 23 are views for illustrating a construction and an operation of a return spring of the seventh embodiment.

In FIG. 22, the upper end, in the figure, of the return spring 7b is pivoted on a spring support pin 21. The spring support plate 20, to which the spring support pin 21 is attached at a right angle to the rotation axis and in a radial direction, is fixed to the clutch casing 100 (not shown). A ball 22 is attached, on the other end, i.e piston side end, of the return spring 7b.

On the other hand, semi-spherically shaped receiving recesses 23 for receiving the ball 22 are formed on the piston 3e on which cam surfaces, the same as used in the fourth, fifth and sixth embodiment, are formed.

The return spring 7b is disposed radially inner than the position where the cam mechanism is disposed.

In the state shown in FIG. 22, the ball 22 attached to the end of piston side of the return spring 7b is received by the receiving recesses 23 of the piston 3e and the length of the return spring 7b is shorter than its free length. Therefore, the piston 3e receives a biasing force of the return spring 7b.

When the piston 3e and the clutch disk 8 are self-tighteningly engaged, the piston 3e is dragged by the clutch disk 8 and moved to the left in the figure.

Figure 23:
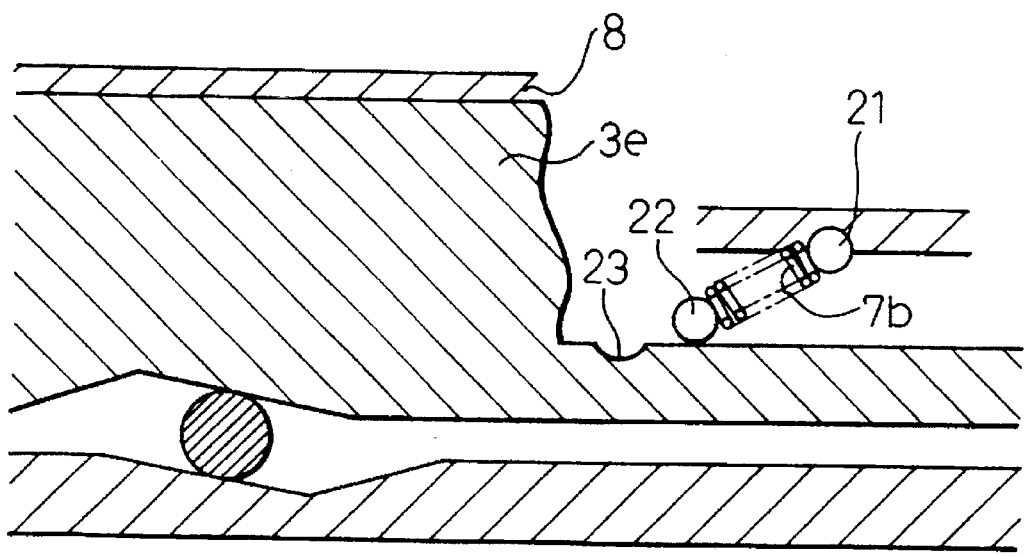

In a process of the above operation, the piston end of the return spring 7b is dragged by the receiving recess 23 of the piston 3e and moves to the left in the figure with the piston 3e to some extent, and thereafter the biasing force on the piston 3e will expire and in due course the piston end of the return spring 7b will depart from the receiving recess 23, and finally a state as shown in FIG. 23 will occur.

On the other hand, by choosing the length of the return spring 7b to enable the ball 22 to be received by the receiving recess 23 and to be shorter than its free length when the boosting engaging is being put into practice by the rotation of the clutch disks 8 in the reverse direction, the return spring 7b generates a force. Therefore, the piston 3e is pushed to the neutral position, i.e. the position where the return spring is at its free length, and the clutch disks 8 can rotate freely without generating drag, when the oil pressure is relieved.

Accordingly, by the seventh embodiment the self-tightening engagement can be surely obtained when the clutch disks 8 rotate in the normal direction, and free rotation of the clutch disks 8 in the reverse direction can be obtained, without generating drag, by choosing the specifications of the related parts as described above.

Thus, the seventh embodiment can surely substitute for the work which is performed by the third brake $B_3$ and the second one-way clutch $F_2$ in the prior art.

Hereafter, the eighth embodiment is described. In the eighth embodiment, one end of the return spring is pivoted on the spring support plate and the other end is pivoted attached to the piston. Thereby, the return spring generates a thrust force which pushes the piston to the direction for self-tightening and decreases the biasing force which acts on the piston when the self-tightening engaging is being put into practice, and generates a force which pushes back the piston to the neutral position when the boosting engagement is being put into practice.

Figure 24:
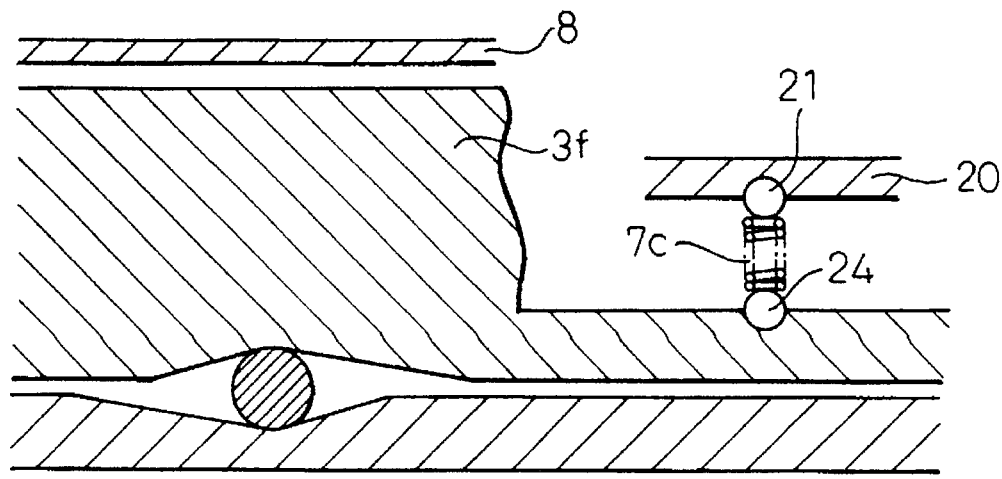
FIG. 24 is a view for illustrating a return spring of the eighth embodiment.

FIG. 24 shows a construction of the eighth embodiment, wherein the reference numerals 20 and 21 represent spring support plate and the spring support pin, respectively, same as in the seventh embodiment. The reference numeral 24 is a spring support pin which is attached to the piston 3f. The both ends of the return spring 7c are pivoted to the spring support pins 21 and 22.

Figure 25:
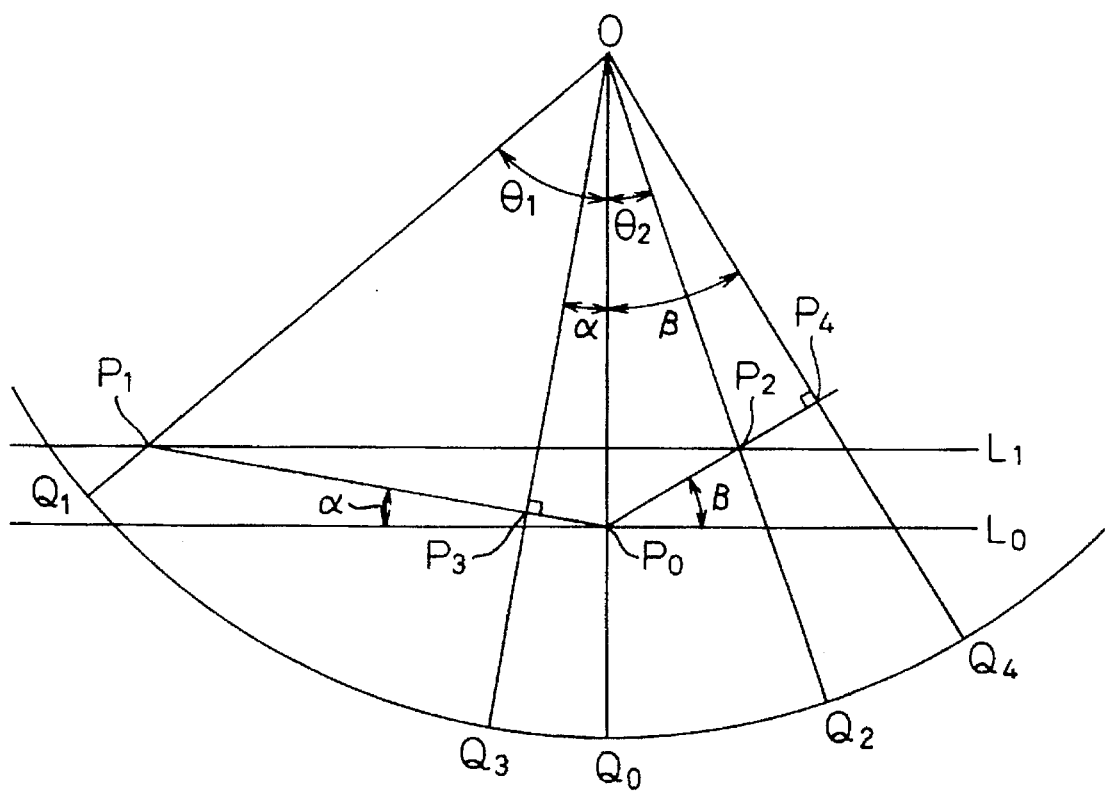
FIGS. 25 and 26 are views for illustrating a working principle of a return spring of the eighth embodiment.

FIG. 25 schematically shows the position of the spring supporting point in the states of self-tightening engagement, boosting engagement and the neutral position.

In the FIG. 25, $L_0$ shows the position of the surface of the piston 3f on which the spring support pin 24 is attached when the piston 3f is fully returned to the side of the first cam member 2a and is in a neutral state, and $L_1$ shows the position of the surface of the piston 3f on which the spring support pin 24 is attached when the piston 3f pushes the clutch disks 8.

The point 0 shows the position of the spring support pin 21 on the side of the spring support plate 20. The points $P_0$, $P_1$, $P_2$ respectively show the position of the spring support pin 24 in a neutral state, a self-tightening engagement state and a boosting engagement state. The point $P_3$ shows the virtual position of the spring support pin 24 when the return spring 7c slants to the side of the self-tightening engagement by cam angle α. The point $P_4$ shows the virtual position of the spring support pin 24 when the return spring 7c slants to the side of the self-tightening engagement by cam angle β.

$\theta_1$ and $\theta_2$ are the slant angles from the neutral position of the return spring 7c, when the spring support pin 24 is positioned at $P_1$ and $P_2$.

As shown in FIG. 25, the specifications of the related parts are chosen to satisfy the condition that the return spring 7c is at a right angle to the surface of the piston 3f at the neutral state.

The points $Q_0$, $Q_1$, $Q_2$, $Q_3$ and $Q_4$ respectively show the virtual freely extended end points of the return spring 7c when the spring support pin 24 is respectively positioned at the above defined $P_0$, $P_1$, $P_2$, $P_3$ and $P_4$.

When a piston having a cam surface with angle A rotates and the spring slants by angle of θ, the compression stroke ΔS of the spring from the free length is shown by the following equation;

$$\Delta S = S[1 - \{1/(\tan A \times \sin \theta + \cos \theta)\}]$$

Figure 26:
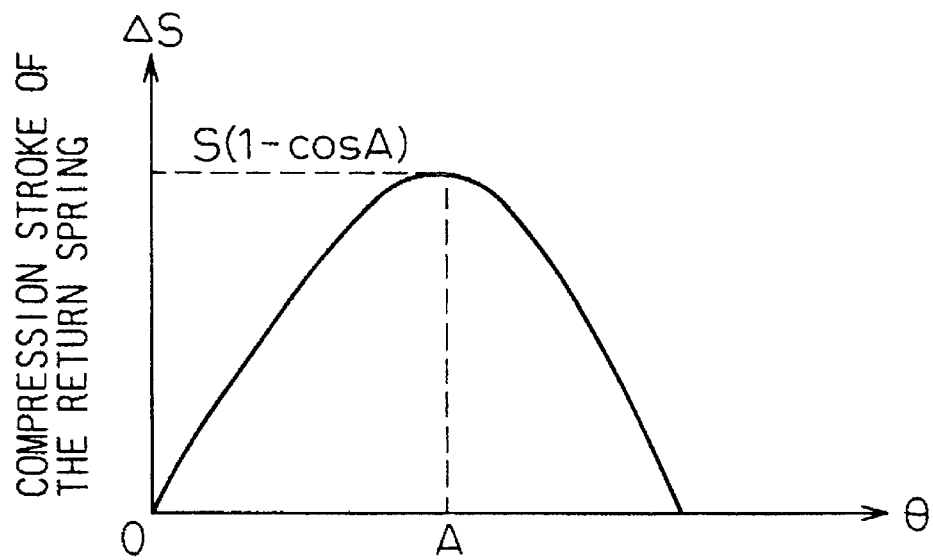

The above equation has a maximum value $S \times (1 - \cos \theta)$ when θ=A, as shown in FIG. 26.

Therefore, when 0<θ<A, ΔS monotonously increases with an increase of θ and the return spring acts in a direction to decrease θ, i.e. in a direction to return the piston to the neutral position.

On the other hand, when A<θ, ΔS monotonously decreases with an increase in θ and the return spring acts in a direction to increase θ, i.e. in a direction to move the piston away from the neutral position.

Accordingly, if the specification of the related parts are chosen to satisfy the condition that the slant angle θ of the return spring 7c is greater than cam angle α, i.e. the position of spring support pin 24 is, for example, at $P_1$ shown in FIG. 25 in the self-tightening engagement state, the self-tightening engagement will not be weakened by the action of return spring 7c since the spring force of the return spring 7c will act to move the piston 3f in the direction of self-tightening and ΔS will decrease.

Also, if the specification of the related parts are chosen to satisfy the condition that the slant angle θ of the return spring 7c is smaller than cam angle β, i.e. the position of spring support pin 24 is, for example, at $P_2$ shown in FIG. 25 in the boosting engagement state, the clutch disks 8 can freely rotate without generating drag by reducing the oil pressure since the piston 3f is moved to the neutral position by the spring force of the return spring 7c which acts to move the piston 3f to the neutral position.

Accordingly, the self-tightening engagement can be surely obtained by the eighth embodiment when the clutch disks 8 rotates in the normal direction, and free rotation of the clutch disks 8 in the reverse direction can be obtained without generating drag, the specifications of the related parts are chosen as described above.

Thus, the eighth embodiment can surely substitute for the work which is performed by the third brake $B_3$ and the second one-way clutch $F_2$ in the prior art.

Figure 27:
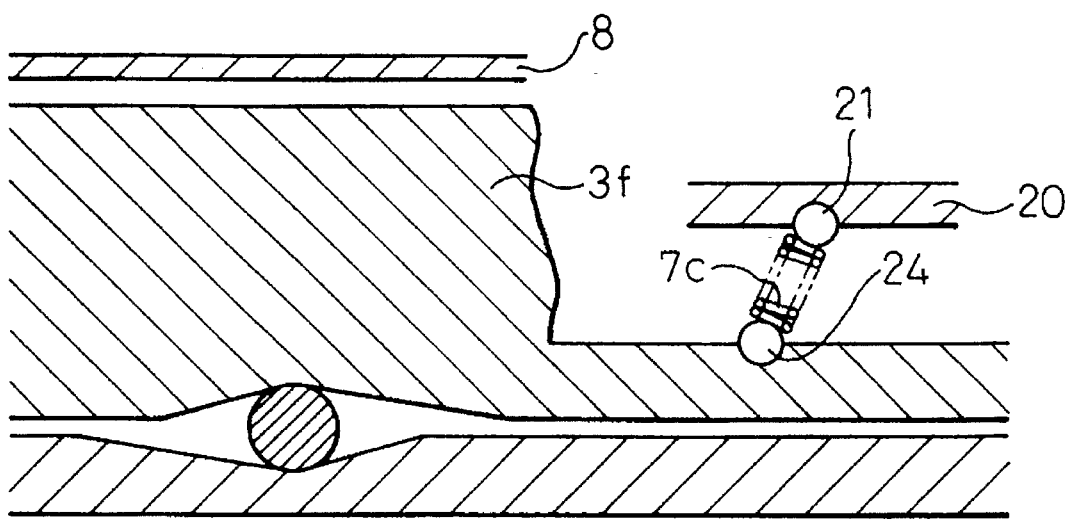
FIG. 27 is a view for illustrating a construction of a the ninth embodiment.

FIG. 27 shows a construction of the ninth embodiment of which different point from the eighth embodiment in that the return spring 7c slants in the neutral state.

Figure 28:
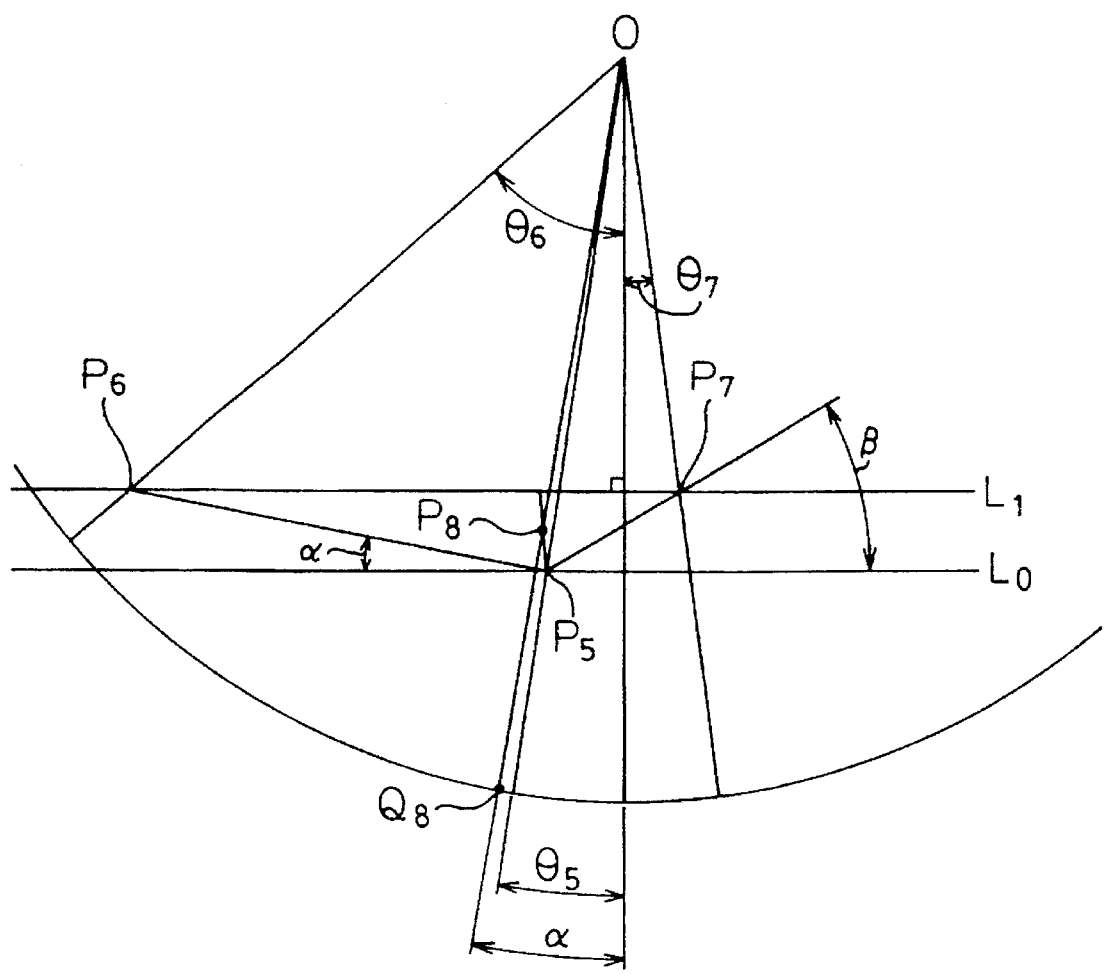
FIG. 28 is a view for illustrating a working principle of the ninth embodiment.

FIG. 28 is prepared to explain the setting of the return spring. In FIG. 28, as in FIG. 25, $P_5$ is the position of spring support pin 24 on the side of the piston 3f and $\theta_5$ is the slant angle from the vertical line in a neutral state.

The specifications of the related parts are chosen to satisfy the condition that $\theta_5$ is slightly smaller than the cam angle α set for self-tightening engagement.

$P_6$ and $\theta_6$ respectively show the position of the spring support pin 24 and the slant angle of the return spring 7c in the self-tightening engagement state wherein, $\theta_6$ is greater than cam angle α.

$P_7$ and $\theta_7$ respectively show the position of the spring support pin 24 and the slant angle of the return spring 7c at the boosting engagement state wherein, $\theta_7$ is smaller than cam angle β.

When oil pressure is supplied after choosing the related parts to satisfy the above described conditions, the piston 3f will move upward in the figure and the slant angle of the return spring 7c, from the vertical line, will correspondingly increase and will exceed the cam angle α in due course.

If the slant angle of the return spring 7c from the vertical line exceeds the cam angle, i.e. if the position of the spring support pin 21 comes over the point $P_8$ where the line extending upward from $P_5$ and the line $OQ_8$ in the figure, the spring force of the return spring 7c acts to move the piston 3f in the direction of self-tightening.

Accordingly, thereafter, the piston 3f can be pushed to the clutch disk 8 to cause an initial frictional engagement and then generates a cam force for self-tightening engagement without supplying oil pressure.

On the other hand, in the boosting engagement state, the return spring 7c generates a force which acts to move the piston 3f to the neutral position. Therefore, the piston 3f returns to the neutral position and the clutch disks 8 can freely rotate in the reverse direction without causing drag when the oil pressure is released.

Accordingly, the self-tightening engagement can be surely obtained by the ninth embodiment when the clutch disks 8 rotate in the normal direction, and free rotation of the clutch disks 8 in the reverse direction can be obtained, without generating drag, by choosing the specifications of the related parts as described above.

Thus, the ninth embodiment can surely perform the work which is performed by the third brake $B_3$ and the second one-way clutch $F_2$ in the prior art. Also a required oil pressure for causing a self-tightening engagement is less than the case of eighth embodiment.

As explained above, according to the present invention, when the relatively rotating members are engaged to each other with a force corresponding to a rotational torque, i.e. self-tighteningly engaged, by the first cam mechanism, no force or only light force acts to weaken the force for the engagement. Accordingly, the self-tightening engagement is surely obtained.

On the other hand, when the relatively rotating members are engaged to each other with a force corresponding to a pushing force of the pushing means, i.e. boostingly engaged, the biasing means acts to decrease the clearance between two cam members which compose the second cam mechanism, i.e. to decrease the axial length of the second cam mechanism. Accordingly, sure releasing of the clutch without generating drag is attained and better fuel consumption is provided.

We claim:

1. A clutch device comprising:
   a pair of members disposed at a distance on a common axis and relatively rotating to each other around said common axis;
   a cam mechanism disposed on said common axis and composed of a first cam mechanism and a second cam mechanism, said first cam mechanism being composed of a pair of cam members and generating an axial thrust force corresponding to rotational torque in order to engage said pair of members after being pushed by a pushing means to one of said pair of members rotating in a direction and thereby causing a frictional engagement of one of said pair of cam members with said one of said pair of members rotating in said direction, and said second cam mechanism being composed of a pair of cam members and generating an axial thrust force corresponding to a pushing force of said pushing means in order to engage said pair of members after being pushed by said pushing means to one said pair of members rotating in a direction reverse to said direction in which said first cam mechanism generates said axial thrust force corresponding to rotational torque and thereby causing a frictional engagement of one of said pair of cam members with said one of said pair of members rotating in said reverse direction, a biasing means for supplying a biasing force acting on said cam mechanism in a direction contrary to a direction of said pushing force of said pushing means, wherein said axial thrust force generated by said first cam mechanism is kept free from being weakened by said biasing force supplied by said biasing means.

2. A clutch device according to claim 1, wherein said second cam mechanism is separately constructed from said first cam mechanism and said biasing force supplied by said biasing means only acts on said second cam mechanism, thereby said axial thrust force generated by said first cam mechanism is kept free from being weakened by said biasing force.

3. A clutch device according to claim 2, wherein said second cam mechanism and said first cam mechanism are both disposed between said pair of members.

4. A clutch device according to claim 2, wherein one of said second cam mechanism and said first cam mechanism is disposed between said pair of members.

5. A clutch device according to claim 1, wherein said first cam mechanism and said second cam mechanism are both disposed on a common pair of cam members and said biasing force acting on said common pair of cam members is weakened when said first cam mechanism is generating said axial thrust force, whereby said axial thrust force generated by said first cam mechanism is kept free from being weakened by said biasing force.

6. A clutch device according to claim 5, wherein said biasing force is weakened by a force supplied by said pushing means.

7. A clutch device according to claim 5, wherein said biasing means is composed of a spring and a spring support member which is enabled to prevent said spring force from acting on said common pair of cam members when said first cam mechanism is generating said axial thrust force, whereby said axial thrust force generated by said first cam mechanism is kept free from being weakened by said biasing force.

8. A clutch device according to claim 5, wherein said biasing means comprises a retractable spring which enables said spring to extend to its free length in order to generate no spring force when said first cam mechanism is generating said axial thrust force, whereby said axial thrust force generated by said first cam mechanism is kept free from being weakened by said biasing force.

9. A clutch device according to claim 5, wherein said biasing means comprises a retractable spring which can vary its length depending on the direction of the rotation of said pair of members in such a manner that the compression stroke of said spring when said first cam mechanism is generating said axial thrust force is smaller than the compression stroke of said spring when said second cam mechanism is generating said axial thrust force, whereby said axial thrust force generated by said first cam mechanism is less weakened by said biasing force than said axial thrust force generated by said second cam mechanism.

10. A clutch device according to claim 9, wherein said retractable spring applies said biasing force to said common pair of cam members at right angles in a neutral state in which both said first cam mechanism and said second cam mechanism are generating no axial thrust force.

11. A clutch device according to claim 9, wherein said retractable spring applies said biasing force to said common pair of cam members while slanted from rotational axis by an angle less than cam angle of said first cam mechanism in said neutral state and while slanted from the rotational axis more than cam angle of said first cam mechanism.

12. A clutch device according to claim 1, wherein at least one of said first cam mechanism and said second cam mechanism has cam surfaces contacting each other through a cam roller.

13. A clutch device according to claim 1, wherein at least one of said first cam mechanism and said second cam mechanism has cam surfaces directly contacting each other.

* * * * *